Jan. 2, 1962 J. G. VAN SANTEN ET AL 3,015,770

RECTIFYING CIRCUIT ELEMENT

Filed July 15, 1958 2 Sheets-Sheet 1

INVENTORS
JOHANNES GERRIT VAN SANTEN
HENDRIK ESVELT
BY
Frank R. Jeifari
AGENT

Jan. 2, 1962 J. G. VAN SANTEN ET AL 3,015,770

RECTIFYING CIRCUIT ELEMENT

Filed July 15, 1958 2 Sheets-Sheet 2

INVENTORS
JOHANNES GERRIT VAN SANTEN
HENDRIK ESVELT
BY
Frank R. Jifari
AGENT

United States Patent Office 3,015,770

Patented Jan. 2, 1962

3,015,770
RECTIFYING CIRCUIT ELEMENT

Johannes Gerrit van Santen and Hendrik Esvelt, Eindhoven, Netherlands, assignors to North American Philips Company, Inc., New York, N.Y., a corporation of Delaware Filed July 15, 1958, Ser. No. 748,750
Claims priority, application Netherlands July 15, 1957
20 Claims. (Cl. 321—8)

This invention relates to circuit elements which afford many advantages for use in electric circuit-arrangements, more particularly those in which rectification of alternating current for a comparatively long or short period is desired. It also relates to methods of using such circuit elements and to their use in electric circuit-arrangements.

Devices having asymmetric conductivity are known, for example, semiconductor devices, such as crystal diodes, transistors and the like, in which a rectifying action is obtained by the use of a semi-conductive body having a p-n transition. However, these known devices, once built up, are permanently rectifying and this in a direction determined by their structure.

An object of the invention is inter alia to provide a circuit element which may be converted from a symmetric state of conductivity for alternating current to an asymmetric state of conductivity for alternating current simply by electrical influencing, while this operation may also be carried out in the reverse direction, if desired. It also purports more particularly to provide such a circuit element which merely by electrical influencing may be converted at will to a symmetric state of conductivity, an asymmetric state of conductivity with rectification in one direction, or an asymmetric state of conductivity with rectification in the other direction.

In its simplest form, the circuit element according to the invention comprises a body in which a zone or region consisting of a semi-conductor adjoins a zone or region consisting of an electret, while means, as a rule contacts on the body, are provided for applying an electric potential difference across the junction between electret and semi-conductor. The term "electret" is to be understood to mean in this case an insulating material and more particularly a material in which ions or dipoles are movable, which material builds up an electric polarisation preferably by the action of an electric field and which can retain this polarisation when the field is removed for a period longer than the dielectric time of relaxation of the insulating material, the term "dielectric time of relaxation" having to be understood to mean the product of the specific resistance and the dielectric constant $\epsilon_0\epsilon_r$, measured in the M.K.S.-system. While said applying means generally comprise contracts on the body, in particular cases one or more connections to the body could be established, for example, by means of an electron beam, or by microwave techniques for example by means of supply wave guides to the circuit element. The semi-conductor preferably exhibits a great difference in effective mobility of its two types of charge carriers, that is to say, the ratio of the effective mobilities is at least 10 and preferably even more than $10^4$. The term "effective mobility" of a type of charge carrier in a semi-conductor is to be understood to mean the mobility of the free charge carriers of this type, multiplied by the number of free charge carriers of this type and divided by the total number of charge carriers of this type, the "total number" having to be understood to mean the sum of the number of free charge carriers and the number of charge carriers of this type which are bound to intermediate levels situated between the valence band and conduction band. Furthermore, use is preferably made of a semi-conductor which, more particularly for the type of charge carriers of small mobility, has a considerably lower space-charge storage capacity than for the other type of charge carriers, that is to say, the ratio of the space-charge storage capacities for the two types of charge carriers is at least 10. The term "space-charge storage capacity" of a semiconductor for a given type of charge carriers is to be understood to mean the number of levels per cm.$^3$ active for storage of this type, the space-charge storage capacity being related in this case not only to the volume, but also to the surface of the crystal.

Asymmetric conductivity of such a circuit element is obtained by polarization of the electret and is probably based inter alia on the following action: the polarization charges retained by the electret after polarization induce a space charge in the semi-conductor which during operation at alternating current of sufficiently high frequency may be different for the two directions of current, more particularly as a result of a difference in effective mobility of the two types of charge carriers and/or a difference in space-charge storage capacity. The electric field in the electret is thus different for the two directions of current and hence also the possibility for the charge carriers to pass through the electret as a result of a kind of tunnel effect, so that the conductivity for the two directions of current is also different. An asymmetric state of conductivity may thus be obtained by electrical polarization of the electret. The circuit element according to the invention may be converted from the asymmetric state of conductivity to the symmetric state of conductivity either by depolarization with the aid of an electric counter field or by means of a spontaneous depolarization which is more or less rapid dependent inter alia upon the choice of the electret. However, it is to be noted that the technical effect of the invention is not limited to this explanation.

In one particular embodiment of a circuit element according to the invention, the body comprises at least three zones situated so that two zones, each consisting of a semi-conductor, are separated by a zone consisting of an electret, means, usually contacts on the body, being provided for applying an electric potential difference between the said semi-conductive zones. Due to the symmetrical structure of this circuit element, the two opposite states of polarization of the electret are now also important and corresponding thereto are two asymmetric states of conductivity for alternating current which differ in the sense of rectification, while there is also the symmetric state of conductivity which occurs when the electret is not electrically polarized.

It is to be noted that from the explanation given above also follows the action previously found that with direct-current load, or alternating-current load of low frequency, for example 2 c./s., in which event the difference in effective mobility of the two types of charge carriers is not important or substantially not important, no asymmetry or substantially no asymmetry in conductivity occurs, whereas for alternating current of a higher frequency, for example 50 c./s., in which event the difference in effective mobility is certainly important, the element is asymmetrically conductive.

In one embodiment of the particular circuit element according to the invention, which may be realized in practice in a simple manner, the body contains a large number of semi-conductive particles, which are separated by an electret at their relative contact areas. The electret then preferably serves as a mechanical binder between the semi-conductive particles. Such a body may be manufactured in a simple manner, for example, by heating a number of semi-conductive particles and electret particles to a temperature such that the last-mentioned particles melt or fuse, thus binding the semi-conductive particles.

In order that the invention may be readily carried into effect, the performance of a circuit element according to the invention, particulars and preferred embodiments thereof, and also practical uses and results obtained in measurements will now be explained more fully with reference to the accompanying drawings, in which:

FIG. 1*a* shows a diagrammatic longitudinal section of a circuit element according to the invention in which two semi-conductive zones are separated by an intermediate layer in the form of an electret.

FIGURES 1*b* and 1*c* show graphs of the variation of the electric potential in the longitudinal section of FIG. 1*a* for two opposite directions of current.

Figure 1:
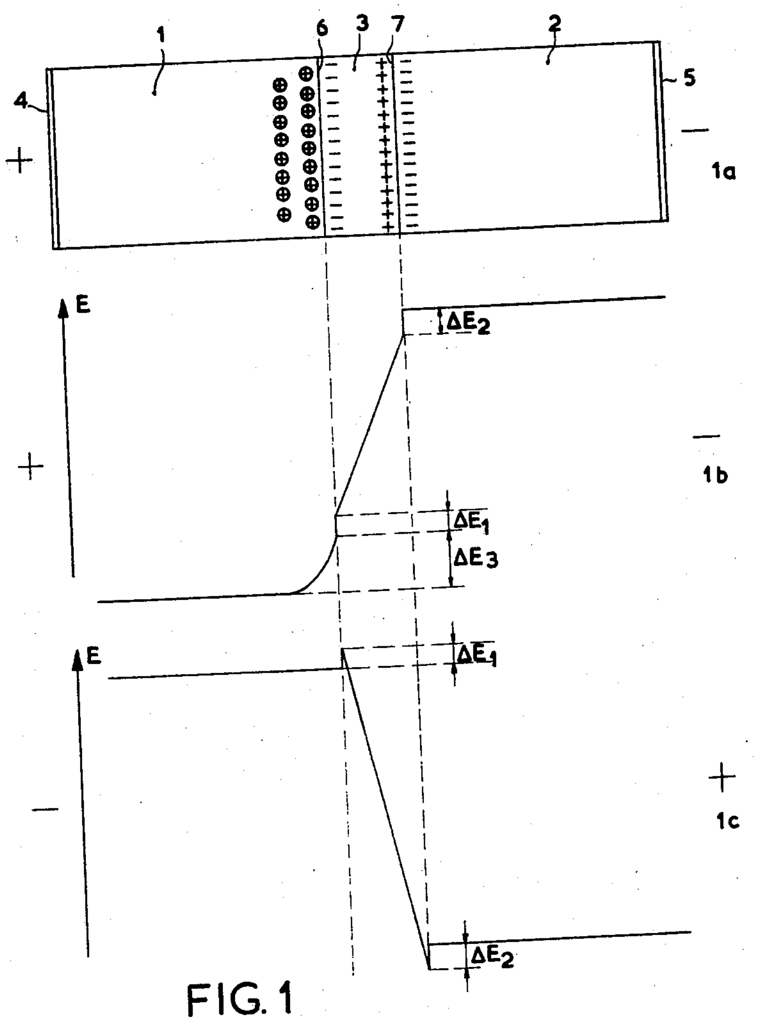

The circuit element according to the invention as shown in FIG. 1*a* comprises two semi-conductive zones 1 and 2, which are separated by a thin intermediate layer 3 in the form of an electret. The whole is not shown with the correct relative proportions. In one practical embodiment, the electret intermediate layer is extremely thin, preferably thinner than 1 $\mu$, for example 0.1 $\mu$, while the semi-conductive zones may be many times thicker dependent upon their conductivity. It is assumed that in the semi-conductor constituted by the zones 1 and 2, the effective mobility of the electrons is much greater than that of the holes, while the space-charge storage capacity for electrons is also much greater than that for holes. In the semi-conductor, this is due, for example, to the presence of a comparatively large number of intermediate levels, so-called hole-traps. Semi-conductors and more particularly photo-conductors which may have this property to a high extent, are inter alia the chalcogenides, for example the chalcogenides of cadmium and more particularly cadmium sulphide. With cadmium sulphide, for example, it is readily possible to obtain a factor $10^8$ in the ratio of the effective mobilities of electrons and holes, while the space-charge storage capacity for electrons is then also very much higher than that for holes. However it is pointed out that other semi-conductors, more particularly semi-conductive compounds or elements are suitable. In order to achieve a high polarizability of the device preferably semi-conductors are used having a relatively large energy gap between conduction and valency bands, in other terms those having a relatively large resistivity. A large number of such semi-conductors are known, and it is easy for one skilled in the art to find other than the mentioned chalcogenides. It is assumed that metallic contacts 4 and 5 are connected to the ends of the zones 1 and 2, respectively. This is not strictly necessary. The configuration of FIG. 1*a* may alternatively form part of a body built up of many semi-conductive zones with intermediate layers in the form of electrets, the current then being supplied through other semi-conductive zones, or zones in the form of electrets. A direct voltage difference of the polarity indicated in FIG. 1*a* is applied between the contacts 4 and 5 and maintained sufficiently long to bring the electret into the polarized state. A polarization charge as represented in FIG. 1*a* is now built up in the electret layer 3. This polarization charge withdraws holes for neutralization from the zone 1 and electrons from the zone 2. This results in a potential distribution in the system as shown in FIG. 1*b*, in which the opposite of the electrical potential, E, is plotted vertically upwards. Potential jumps $\Delta\epsilon_1$ and $\Delta\epsilon_2$ occur at separating surfaces 6 and 7, wherein $\Delta\epsilon_2 > \Delta\epsilon_1$, as a result of the dipole charges at the separating surfaces. Furthermore, adjacent the separating surface 6 in the semi-conductive zone 1 there occurs a space-charge layer of a certain thickness in which the remaining portion of the space charge induced by the polarized electret is stored in intermediate levels. The thickness of the said space-charge layer is dependent inter alia upon the space-charge storage capacity in the interior of the semi-conductor 1. Set up across this space-charge layer is a voltage drop $\Delta\epsilon_3$ which, especially because of its extensiveness, is considerably greater than the jumps $\Delta\epsilon_1$ and $\Delta\epsilon_2$ across the dipole layers. Adjacent the separating surface 7 in the semi-conductive zone 2, such a layer does not occur or occurs only over a negligible thickness as a result of the high spaced-charge storage capacity for electrons, so that it is not necessary to make distinction in regard to the potential variation between charges at the surface and space charge in the thin volume layer. Set up across the electret layer 3 is thus a voltage difference which is substantially equal to the voltage difference applied, decreased by the sum of the said potential jumps $\Delta\epsilon_1$, $\Delta\epsilon_2$ and $\Delta\epsilon_3$. Ohmic voltage losses across the semi-conductive zones have then not been taken into account. The current strength occurring in the circuit element is directly proportional to the possibility of charge carriers, in this case electrons, passing through the electret layer 3 as a result of a kind of tunnel effect, and this tunnel possibility becomes much greater with increasing electric field strength in the electret. When the voltage applied is removed, the electret layer retains its polarization charge for a shorter or longer period dependent inter alia upon the mobility of the ions in the electret and the retaining action of the charges induced in the semi-conductor. If, now, a voltage is applied in the opposite direction, that is to say, if zone 1 is made negative with respect to zone 2, the mobile electrons in the semi-conductive zone 1 travel towards the separating surface 6, compensating there very rapidly the action of the extensive positive space-charge. This process may readily take place, even when the frequency is not too low, within the half cycle in which this polarization occurs, whereas the supply of the less mobile holes in the zone 2 to separating surface 7 is too slow and insufficient to build up any appreciable space charge adjacent separating surface 7 within the half cycle when the frequency is not too low. The dipole jumps $\Delta\epsilon_1$ and $\Delta\epsilon_2$ on the separating surfaces may remain substantially unchanged. From this results a variation in potential as shown in FIG. 1*c*, in which the opposite of the electric potential, as before, is plotted vertically upwards. The electric field strength in the electret for this direction of current is appreciably greater than for the direction of current of FIG. 1*b*, which involves a considerably greater tunnel possibility for the electrons. The condition of FIG. 1*c* is thus obviously the direction of passage of the circuit element when polarized in the manner illustrated in FIG. 1*a*. If another field occurs in the initial direction during the subsequent half cycle, the condition of FIG. 1*b* is restored within this half cycle, since on account of the small possibility of recombination between free electrons and holes in the volume of the semi-conductor bound to intermediate levels, the positive space charge leading to the jump $\Delta\epsilon_3$ during the previous cycle, was neutralized, it is true, but not destroyed, and thus again becomes active after change of polarity as soon as the mobile electrons are discharged to contact 4.

Symmetric conductivity thus occurs for direct current and alternating current of sufficiently low frequency, whereas asymmetric conductivity occurs for alternating current of comparatively high frequency. The limiting frequency range is dependent inter alia upon the extent of the difference in effective mobility of the two types of charge carriers and this is determined by the choice of the semi-conductor and the doping thereof. It is also pointed out that the direction of passage of the current through the system is opposite to the direction of the electric field by which the polarization has taken place. It will also be readily evident now that transition from the asymmetric state of conductivity to the symmetric may be obtained, apart from spontaneous depolarization, by applying a direct voltage field of a polarity opposite to the original for a sufficiently long time, while for the purpose of accelerating the depolarization process the whole is preferably heated to a higher temperature in order to increase the conductivity and mobility of the zones or dipoles of the electret. This heating may take place from the exterior, but it is also possible to pass so high a current in the opposite direction through the circuit element that sufficient heat is produced in the interior of the system. Reversal of the polarization of the electret may be effected in the same way and results in reversal of the sense of rectification of the circuit element. Although the performance of the circuit element according to the invention has been explained with reference to the configuration of FIG. 1*a*, it is naturally not limited to such a configuration. Thus, a circuit element according to the invention comprising only one semi-conductive zone and one zone in the form of an electret permits of obtaining an analogous action, except that in addition to the symmetric state of conductivity only one asymmetric state of conductivity is possible. Furthermore, the holes instead of the electrons may have a greater mobility in the semi-conductor and the factors previously mentioned may, in their relative proportion, be different in certain cases and nevertheless lead to the asymmetry found in practice in the conductivity of such a system. In the foregoing it has also been assumed that the semi-conductive zones 1 and 2 are made of the same material, in other words, are of the same conductivity type and conductivity. It will readily be clear that a difference in conductivity between the two semi-conductive zones cannot alter anything in the effect according to the invention, while the zones on each side of the electret may also be of opposite conductivity types, in which event the known constant asymmetry resulting therefrom is super-imposed on the asymmetry of conductivity controllable by the polarisation of the electret, so that an initial asymmetry due to the difference in conductivity type may already exist when the electret is in the depolarised state. It is also possible that in certain cases other factors than those previously mentioned play a part. However, under the conditions described, the explanation given is the most probable. The invention is naturally not limited to this explanation.

The thickness, the specific resistance and the character of the zones of which the circuit element is built up must, of course, be chosen so that conductivity and polarization of the electret are possible. Thus, use is preferably made of an electret having a specific resistance higher than 10 ohm-cm., because although the time of spontaneous depolarization is not equal to the dielectric time of relaxation, a low specific resistance usually shortens the time of spontaneous depolarization of an electret. The thickness of the electret layer is to be chosen so that a reasonable tunnel possibility remains, preferably less than $1\mu$, for example several tenths of a micron. However, also other electrets can easily be chosen by one skilled in the art. Glass enamels have been found very suitable as an electret. They can be heated in the pulverulent state with semi-conductive grains until melting or fusion of the glass enamel occurs, so that they also serve as a binder.

If the semi-conductor used in a circuit element according to the invention is a photo-conductor, it is possible to act upon the conductivity characteristics of the circuit element by irradiation with electro-magnetic or corpuscular radiation, which may afford advantages for special uses. By utilizing a photo-conductor with large band gap, which has so high a dark resistance, preferably higher than $10^8$ ohm-cm., for example $10^{10}$ ohm-cm., that in the non-irradiated condition there is substantially no conductivity through the circuit element, one obtains the additional advantage, very useful for certain applications, that the circuit element can be made more or less conductive only by irradiation with electromagnetic or corpuscular radiation, so that an additional switching function is provided. However, irradiation is then usually required for polarization, depolarization or change of polarization. In the irradiated condition, either symmetric or asymmetric conductivity occurs, dependent upon the preceding polarization of the electret, whereas in the non-irradiated condition there is substantially no conductivity despite the polarization. The invention also permits of obtaining a circuit element, the body of which comprises a layer, while means, usually contacts on the layer, are provided for polarizing the layer differently from place to place. A given polarization pattern may be provided and retained on this circuit element, which pattern may be scanned with alternating current from place to place. A possibility of use of such a circuit element resides, for example, in a memory circuit, in which it must be possible for a given memory pattern to be stored for any desired period and, if desired, read out or again erased. Such a circuit element may also include a mashing member having a permeability to radiation which differs from place to place, the semi-conductor then used being a photo-conductor having so high a dark resistance that the system has substantially no conductivity without irradiation. The mask might comprise, for example, an opaque plate having a large number of equidistant apertures. Upon irradiation of one aperture, the state of conductivity of the layer under this aperture may be read out. Upon irradiation of the whole, all apertures may be read out simultaneously. Numerous other uses of such circuit elements are also possible. One such embodiment is illustrated schematically in FIG. 5, and comprises a layer 40 built up of semiconductor elements 41 and electret elements 42 with suitable contacts 43 in place. Selected areas of the layer may be irradiated from a light source 45 through an opaque plate 46 containing a desired array of apertures 47.

It will be evident that in circuit elements built up of a large number of small semi-conductive zones and electret zones and in which photo-conductivity is used, use is generally made of an electret permeable to radiation.

Figure 2:
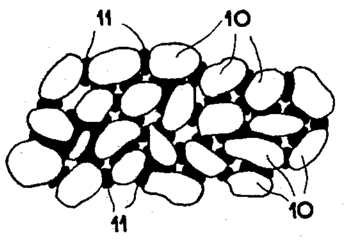
FIG. 2 is a sectional view of part of the body of a circuit element according to the invention.
Figures 3, 5:
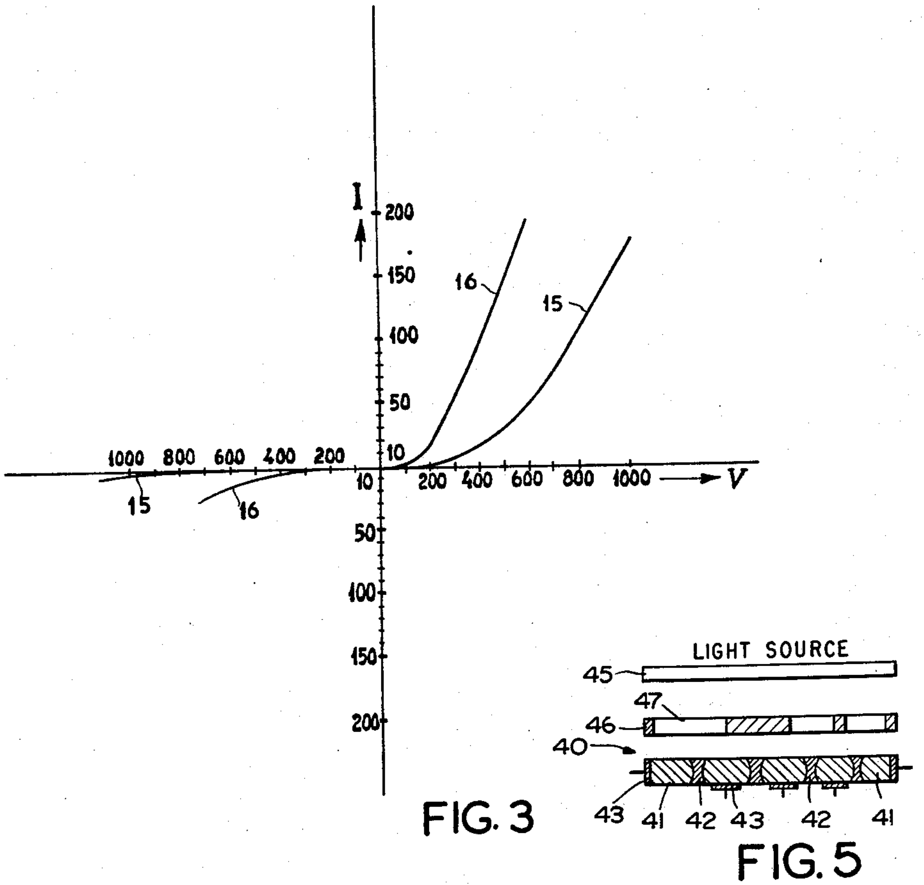
FIG. 3 is a graph of symmetric conductivity characteristics of a circuit element according to the invention, in which a photo-conductor is used as a semi-conductor.
FIG. 5 shows a modification.

Several embodiments of circuit elements according to the invention will now be described, which are built up in the manner shown diagrammatically in FIG. 2, while several characteristics of such a circuit element will be explained with reference to FIG. 3.

*Example 1*

The initial material used is a finely-divided photo-conductive n-type cadmium sulphide powder having a specific resistance of $10^{10}$ ohm-cm., which is obtained by heating grains of cadmium sulphide after the addition of $10^{-4}$ grammols. of $Ga(NO_3)_3$ and $10^{-4}$ grammols. of $Cu(NO_3)_2$ per grammol. of cadmium sulphide at 950° C. in an $H_2S$-atmosphere for 2 hours, followed by sieving to a maximum size of grain of 45 microns. This powder is intimately mixed in a mixing vessel with a very finely-divided lithium-containing glass enamel powder (size of grain of about 10 microns) in a volume ratio of 4:1. The preferred composition of such a mixture contains from 10 to 30 vol.-percent of glass enamel and for the remaining portion semi-conductive, more particularly photo-conductive material. The chemical analysis of the glass enamel, expressed in mol.-percent, was as follows: $Li_2O$, 15%; $K_2O$, 7.5%; CaO, 10.5%; SrO, 4.5%; ZnO, 10.3%; $TiO_2$, 2.8%; $Al_2O_3$, 2.3%; $SiO_2$, 18.8%; $B_2O_3$, 28.3%. The finely-divided mixture is suspended in an organic liquid, for example butyl acetate, subsequently provided in the form of a thin layer of 150 microns thick on a carrier of glass, followed by heating at 600° C. for 3 minutes. By sealing of the grains of glass enamel to the grains of cadmium sulphide, the grains of glass enamel then fulfilling the function of a binder, a layer is thus obtained which, though porous, has good coherence, said layer being shown diagrammatically in partial section in FIG. 2. In this figure, the grains 10 are the photo-conductive grains and 11 are electret layers. For the sake of clarity, the thin electret layers between the photo-conductive grains are shown with exaggerated thickness. Two linear electrodes each having a length of 2 cms. are provided by evaporation with a spacing of 0.5 mm. on the upper side of the layer, so that the space between the electrodes is $20\times0.5\times0.15$ mm.$^3$. When measured in the non-illuminated condition, the current through the system is found to be less than $10^{-5}$ amp. for both direct voltage up to 1000 volts and alternating voltage of 120 c./s. up to a peak voltage of 1000 volts. Upon illumination with white light having a strength of 10 lumens a current of $1.3\times10^{-3}$ amp. flows through the circuit element at a direct voltage of 300 volts between the electrodes, the current being symmetric for both directions. With the same illumination, a current of 1.3 milliamp., which is symmetric in both directions, flows at an alternating voltage of 1000 volts peak voltage having a frequency of 120 c./s. Subsequently, with the same illumination and at a direct voltage of 300 volts, the circuit element is polarized for 5 seconds while heating to 110° C. After cooling, its alternating-current behaviour is tested. With the same illumination and at an alternating voltage of 120 c./s. up to a peak voltage of 1000 volts, the current strength is found to be less than $10^{-5}$ amp. in the direction of the polarizing voltage of 5 milliamps. in the other direction, in other words the direction of passage is opposite to the direction of the polarizing voltage. When measured at direct voltage and alternating voltage of several c./s., but under otherwise unvaried conditions, the circuit element is found to be still symmetrically conductive despite the polarization, the current strength at 300 volts being approximately $1.3\times10^{-3}$ amp. for both directions. Subsequently, the circuit element is heated to 110° C. and, with the same illumination, a direct voltage of 300 volts is now applied having a polarity opposite to that with which the circuit element is polarized. Via the symmetric state of conductivity, the circuit element is thus converted within 15 seconds to the asymmetric state of conductivity with opposite sense of rectification. When measured at an alternating voltage of 1000 volts and 120 c./s. with the same illumination, substantially the same rectifying factor occurs, but only the direction of passage and the blocking direction have changed.

After continuous operation for 3 weeks, the values measured were found to have hardly changed, which is attributable to the use of the lithium-containing glass enamel as an electret, since lithium-containing glass enamels have a very low conductivity of ions due to the low mobility of lithium ions. Thus, they also retain the polarization for a long time.

*Example 2*

A similar circuit element is manufactured in the same manner as described in Example 1, except that a glass enamel rich in sodium is used instead of a lithium-containing glass enamel. The chemical analysis of the sodium rich glass enamel, expressed in mol. percent was as follows: $Na_2O$, 15.0%; $K_2O$, 7.5%; CaO, 12.5%; SrO, 4.5%; ZnO, 8.3%; $TiO_2$, 2.8%; $Al_2O_3$, 2.3%; $SiO_2$, 18.8%; $B_2O_3$, 28.3%. Analogous phenomena as described in Example 1 are found. Only the stability appeared to be considerably lower, in other words, the depolarization process was more rapid. After continuous operation for a week, the rectifying factor of 1 to 100 had decreased to 1 to 5. This is assumed to be attributable to the use of a glass enamel rich in sodium, which has a considerably higher mobility for ions than lithium-containing glass enamel, resulting in quicker depolarization.

*Example 3*

Another circuit element according to the invention, which is manufactured in otherwise the same manner and of the same composition as described in Example 1, is polarized with a direct voltage of 700 volts while irradiating with white light of a strength of 30 lumens for 10 seconds. There is a flow of current of 3 milliamps., which internally evolves sufficient heat to bring about rapid polarization of the electret, so that heating from the exterior is superfluous. Subsequently, several alternating-voltage characteristics are measured. Without illumination, the current strength up to 1000 volts peak voltage is found to be less than $10^{-5}$ amp. in both directions. At an alternating voltage of 120 c./s., the relationship between the peak voltage and the peak current in both directions is now measured for two different illuminating intensities. FIG. 3 shows the corresponding characteristics, the peak voltages in volts being linearly plotted horizontally and the peak current in the direction of passage being plotted vertically upwards and the peak current in the blocking direction being plotted downwards on a linear scale in units of $10^{-5}$ amp. The direction of passage is opposite to the direction of the voltage with which the switching element was polarized. Characteristics 15 and 16 occur with illuminating intensities of 9 and 30 lumens, respectively. It is to be noted that, although the circuit element has been polarized at 700 volts, rectification nevertheless occurs to higher peak voltages. However, it will be evident that, as a rule, it is preferable to operate the circuit element at an alternating voltage (peak voltage) which is less, or even less than half, the voltage with which the polarization has been effected. After three weeks, several points on the characteristic curves were again measured, and it was found that substantially no spontaneous depolarization had taken place. This high stability is attributable to the use of a lithium-containing glass enamel as an electret.

*Example 4*

A circuit element was manufactured in a similar manner as described in Example 1, except that a semi-conductive n-type cadmium sulphide powder having a specific resistance of $10^5$ ohm-cm. was used. Before polarizing this circuit element, a peak current of 1 ma. was measured in both directions at an alternating voltage of 120 c./s. (peak voltage 140 volts). Illumination is in this case superfluous on account of the comparatively low specific resistance. Subsequently, the circuit element was polarized for 10 seconds with a direct voltage of 300 volts without illumination, resulting in an internal heat production of about 1.5 watt, which was found sufficient for rapid polarization. After cooling, a current of $10^{-4}$ amp. was found to flow in the blocking direction at an alternating voltage of 120 c./s. up to a peak voltage of 140 volts, whereas a current of $3\times10^{-3}$ amp. occurred in the direction of passage. As before, the blocking direction coincided with the direction in which the polarization voltage was applied. The conductivity was symmetric for direct voltage. After three weeks, the values measured had hardly changed.

Analogous phenomena have been found when using cadmium selenide.

The circuit elements according to the invention and more particularly those of symmetric structure are serviceable for numerous uses in circuit arrangements. It appears from the foregoing description, that in a circuit element according to the invention in general the current path extends substantially through one or more junctions between an electret zone and a semiconductor zone. The circuit elements according to the invention are particularly suitable for application in circuits in which the conductivity state for alternating current of one or more circuit-elements according to the invention is used, more particularly the conductivity state of the current path extending through one or more junctions between a semiconductor and an electret. They may be used in the polarized state as rectifying elements for alternating current of not too low frequency. Their radiation-sensitive properties make them suitable as radiation-sensitive switches with symmetric or asymmetric conductivity for alternating current. However, the particular feature of the circuit elements according to the invention shows to better advantage in circuit arrangements in which an asymmetric state of conductivity is desired only temporarily or in which switching-over from one sense of rectification to the other is desired. Such circuit arrangements then include means, more particularly one or more direct-voltage sources, for polarizing, depolarizing or reversing the polarity of a circuit element. The circuit arrangement then preferably also includes means of heating the circuit element for bringing about rapid change-over from one state of conductivity to the other. Such means may be included in the circuit arrangement separately from the polarizing means, in other words, the circuit element is then heated externally. In other cases, it may be advantageous to include them in the means used for the forming process, in other words, the field applied is then chosen of a strength such as to cause sufficient internal dissipation of heat in the circuit element. However, depolarization may alternatively be effected spontaneously without influencing from the outside. However, in this case, the spontaneous depolarization is preferably accelerated by including in the circuit arrangement means for external heating of the circuit element.

Circuit arrangements including circuit elements in which a photo-conductor of very high dark resistance is used, also comprise means of irradiating such circuit elements. The circuit arrangements according to the invention also usually include alternating-voltage sources utilising the state of conductivity of the circuit elements.

One embodiment of a circuit arrangement which may be used as a memory circuit, will now be explained with reference to FIG. 4.

Figure 4:
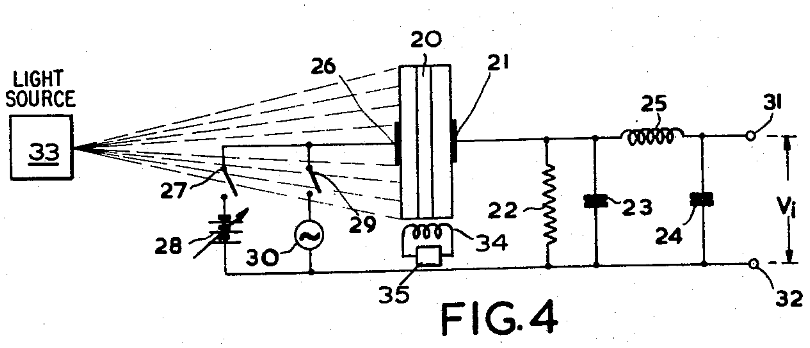
FIG. 4 shows a schematic circuit-arrangement in which a circuit element according to the invention is used as a memory element.

FIG. 4 shows a circuit diagram, in which a symmetric circuit element according to the invention is indicated by 20. Connected to an electrode 21 of the circuit element is a load resistor 22, which has connected parallel to it a low-pass filter comprising capacitors 23, 24 and an inductance 25. Connected to another electrode 26 are two branches connected in parallel, one of which comprises a switch 27 and a direct-voltage source 28, the voltage of which is variable and more particularly may be commutated, i.e., reversed, whereas the other branch comprises a switch 29 and an alternating-voltage source 30 which provides an alternating voltage of a frequency such that it is not passed by the low-pass filter (23, 24, 25). The signal voltage $V_1$ is derived between terminals 31, 32. It is also assumed that the polarizing means (27, 28) bring about an electric field strength in the circuit element such that sufficient heat is evolved in the circuit element to ensure rapid polarization.

When switch 29 is closed, the alternating voltage provided by the source 30 is set up across the circuit element 20 and, if it has not yet been polarized, a symmetric alternating voltage is set up across resistor 22, but this voltage is not passed by the low-pass filter (23, 24, 25) so that, if the circuit element is in the symmetric state of conductivity, no potential difference occurs between the terminals 31, 32.

If, now, switch 27 is closed, the circuit element 20 is polarized in a determined direction so as to pass current in only one direction. The direct-voltage component only which occurs across resistor 22 is passed by the filter, resulting in a direct-voltage difference of a given polarity between the terminals 31 and 32. If, now, the voltage source 28 is reversed, the circuit element is first depolarized and then polarized in the opposite direction. This results in reversal of the sense of rectification of the circuit elements 20, so that the polarity of the signal voltage $V_1$ also changes with the polarity of the direct-voltage component across resistor 22. Expressed in terms of a memory circuit, the information originating from the means (27, 28) may be impressed upon the memory element more particularly in three different conditions so that it can assume a symmetric state of conductivity, an asymmetric state of conductivity in one direction, or an asymmetric state of conductivity in the other direction, which are passed by the scanning mechanism (29, 30) as a zero voltage, a voltage of one polarity, or a voltage of the other polarity to the terminals (31, 32) and may there be used further. It is also possible to include a light source 33 in the circuit arrangement. This may be advantageous more particularly if the circuit element 20 utilizes a photo-conductor having so high a specific resistance that conduction through the circuit element is substantially impossible without illumination. By regulating the illumination, the system may then be brought at will into the active or the inactive state, or a given desired active state of conductivity may be adjusted. Also, as indicated previously, for rapid depolarization, a separate heater may be employed. This has been illustrated in the figure by a heating filament 34 energized by a current source 35.

What is claimed is:

1. As a new electrical device, the combination of a semiconductive body and an electret in contact with one another and forming a junction therebetween, means for applying an electrical signal across the said junction to establish a current path for the signal through the contacting semiconductive body and electret, and means for polarizing the electret.

2. An electrical device as set forth in claim 1 wherein the semiconductive body contains two types of charge carriers whose ratio of effective mobilities is greater than $10^4$.

3. An electrical device as set forth in claim 1 wherein the semiconductive body contains two types of charge carriers with substantially different space-charge storage capacities.

4. An electrical device as set forth in claim 1 wherein the semiconductive body is a photoconductive body that is substantially non-conductive in the absence of impinging radiation, and means are provided for irradiating the photoconductive body.

5. A controllable rectifier comprising a semiconductive body and an electret in contact with one another and forming a junction therebetween, said semiconductive body containing two types of charge carriers whose ratio of effective mobilities is greater than 10 and whose ratio of space-charge storage capacities is also greater than 10, means for applying an alternating-current signal across the said junction to establish a main current path for the signal through the contacting semiconductive body and electret, and means for polarizing the electret including means for heating the electret.

6. A controllable rectifier as set forth in claim 5 wherein the semiconductive body is a photoconductive chalcogenide, and the electret is a glass enamel.

7. A controllable rectifier as set forth in claim 6 wherein the chalcogenide is cadimum sulphide, and the enamel is a lithium-containing glass enamel.

8. A new electrical device comprising the combination of two semiconductive bodies and an electret therebetween and in contact with one another and forming two junctions therebetween, means for applying an alternating-current signal to the semiconductive bodies and thus across the said junctions to establish a main current path for the signal through the contacting semiconductive bodies and electret, and means for polarizing and depolarizing the electret.

9. An electrical device as set forth in claim 8 wherein the semiconductive body contains two types of charge carriers whose ratio of effective mobilities is greater than $10^4$, said electret being thinner than one micron and having a resistivity greater than $10^8$ ohm-cm.

10. An electrical device as set forth in claim 8 wherein many semiconductive bodies are provided with each adjacent pair joined together by a thin electret.

11. An electrical device as set forth in claim 10 wherein the many semiconductive bodies and electrets form a layer, and means are provided for polarizing in different directions spaced regions of the layer.

12. An electrical device as set forth in claim 10 wherein an apertured masking member is disposed adjacent the combination, and means are provided for irradiating the regions of the semiconductive bodies and electrets behind the apertures.

13. A new controllable rectifier comprising the combination of a semiconductive body and an electret in contact with one another and forming a junction therebetween, means for applying an alternating-current signal across the said junction to establish a main current path for the signal through the contacting semiconductive body and electret, means for polarizing the electret, and means for heating the electret.

14. A rectifier as set forth in claim 13 wherein means are provided for irradiating the semiconductive body.

15. A circuit arrangement comprising a controllable rectifier of the type comprising contiguous semiconductive and electret zones forming a junction and having two terminals on opposite sides of the junction, a load circuit and an alternating current signal source connected in series across the terminals, and a direct-current voltage source connected to the terminals for polarizing the electret.

16. A circuit arrangement as claimed in claim 15 wherein means are provided for reversing the voltage to depolarize the electret.

17. A circuit arrangement as claimed in claim 15 wherein means are provided for irradiating the rectifier.

18. An asymmetrically-conductive device comprising the combination of two semiconductive regions and an electret region therebetween and in contact therewith and forming two junctions therebetween, and means for establishing a potential difference between the said two semiconductive regions to establish a current path through the semiconductive and electret regions and across the two junctions, said electret being in a polarized state, whereby said device is asymmetrically conductive to alternating current signals whose frequency is relatively high.

19. A device as set forth in claim 18 wherein the semiconductive regions are constituted of a material having two types of charge carriers whose effective mobilities differ by a factor of at least $10^4$.

20. A device as set forth in claim 18 wherein the device comprises a mixture of semiconductor particles and fused glass enamel particles with the latter interposed between the former.

References Cited in the file of this patent

The Electret, by Gutman, Reviews of Modern Physics, vol. 20, No. 3, July 1948, pp. 457–471.

Plastic Electrets and Their Applications, by Wieder and Kaufman, Electrical Engineering, June 1953, pp. 511–514.

UNITED STATES PATENT OFFICE

CERTIFICATE OF CORRECTION

Patent No. 3,015,770 January 2, 1962

Johannes Gerrit van Santen et al.

It is hereby certified that error appears in the above numbered patent requiring correction and that the said Letters Patent should read as corrected below.

Column 5, line 57, for "10 ohm-cm" read -- $10^8$ ohm-cm --.

Signed and sealed this 26th day of March 1963.

(SEAL)

Attest:

ESTON G. JOHNSON

Attesting Officer

DAVID L. LADD

Commissioner of Patents